United States Patent
Alasti et al.

(10) Patent No.: US 12,507,198 B2
(45) Date of Patent: Dec. 23, 2025

(54) LOCATION DETERMINATION CELLULAR SYSTEM

(71) Applicant: DISH WIRELESS L.L.C., Englewood, CO (US)

(72) Inventors: Mehdi Alasti, Englewood, CO (US); Kazi Bashir, Englewood, CO (US); Siddhartha Chenumolu, Englewood, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 350 days.

(21) Appl. No.: 18/219,974

(22) Filed: Jul. 10, 2023

(65) Prior Publication Data

US 2025/0024421 A1 Jan. 16, 2025

(51) Int. Cl.
*H04W 64/00* (2009.01)
*H04L 5/00* (2006.01)
*H04W 52/02* (2009.01)

(52) U.S. Cl.
CPC ......... *H04W 64/003* (2013.01); *H04L 5/0048* (2013.01); *H04W 52/0209* (2013.01)

(58) Field of Classification Search
CPC ............................ H04W 64/003; H04L 5/0048
See application file for complete search history.

(56) References Cited

U.S. PATENT DOCUMENTS

| 2015/0004999 A1* | 1/2015 | Schuler | H04W 64/00 |
| | | | 455/456.1 |
| 2023/0319508 A1* | 10/2023 | Colonna | H04W 4/029 |
| | | | 455/456.1 |

FOREIGN PATENT DOCUMENTS

CN 101466117 A * 6/2009

* cited by examiner

*Primary Examiner* — Erika A Washington
(74) *Attorney, Agent, or Firm* — Seed Intellectual Property Law Group LLP (57) ABSTRACT

A location of a mobile phone in a cellular network is determined when the mobile phone has been turned off, placed in airplane mode, inactive mode or in idle mode. A first cell of interest and times of interest is received, and a location determination server in communication with the cellular network requests call data records (CDRs) associated with the first cell of interest and the times of interest. The location determination server receives the requested CDRs and determines possible locations of the mobile phone at the times of interest when the mobile phone antenna is powered off, airplane mode, idle or inactive using the received CDRs.

20 Claims, 6 Drawing Sheets

LOCATION DETERMINATION CELLULAR SYSTEM

BACKGROUND

Currently, those in law enforcement and other similar fields want to determine the location of people of interest around the times when a crime was committed. A user's mobile phone can indicate the user's location while the user's mobile phone is in operation.

However, if the mobile device is in airplane mode, in idle mode or is powered off, the user's location (via the mobile phone) will not be recorded and thus, determining the location of the user at all times is a challenge.

SUMMARY

Various embodiments provide solutions to provide cellular systems and methods for determining locations of a mobile device even when the mobile device is inactive, in airplane mode or turned off according to CDRs of the mobile device and other information such as intelligence.

According to an embodiment, disclosed is a cellular system to determine possible locations of a mobile phone that has been in airplane mode, idle mode, inactive mode or powered off. The system communicates with a cellular network that includes a plurality of cell sites. Each cell site includes: at least one tower configured to send and receive cellular communications to and from the mobile phone; a base station configured to process and control communications to/from the mobile phone through the at least one tower; and a mobile location server that stores call data records (CDRs) for the mobile phone; and a core network connected with the plurality of cell site. The core network is deployed remote from each of the cell sites. The system includes a location determination server configured for: receiving a first cell of interest and times of interest; receiving the CDRs associated with the first cell of interest and the times of interest; and determining possible locations of the mobile phone at the times of interest when the mobile phone antenna is powered off, airplane mode, idle or inactive using the received CDRs.

According to an embodiment, disclosed is a method that determines possible locations of a mobile phone in a cellular network when the mobile phone has been turned off, placed in airplane mode, inactive mode or in idle mode. A first cell of interest and times of interest is received, and a location determination server in communication with the cellular network requests call data records (CDRs) associated with the first cell of interest and the times of interest. The location determination server receives the requested CDRs and determines possible locations of the mobile phone at the times of interest when the mobile phone antenna is powered off, airplane mode, idle or inactive using the received CDRs According to an embodiment, disclosed is a cellular system to determine possible locations of a mobile phone that has been in airplane mode, idle mode, inactive mode or powered off. The system includes a plurality of clusters, where each cluster is configured to operate respective cell sites. Each cell site may include: at least one tower configured to send and receive cellular communications to and from a cellular mobile phone; a base station configured to process and control communications to/from the cellular mobile phone through the at least one tower; and a mobile location server that stores call data records (CDRs) for a cellular mobile phone and transmits the CDRs to a location determination server. The system further includes a core network connected with the plurality of clusters over a wide area network via a master module, where the core network is deployed remote from each of the plurality of clusters, wherein the master module manages messages from each DU via the plurality of clusters. The location determination server is configured for: receiving a first cell of interest and times of interest; receiving the CDRs associated with the first cell of interest and the times of interest; and determining possible locations of the cellular mobile phone at the times of interest when the mobile phone antenna is powered off, airplane mode, idle or inactive using the received CDRs.

BRIEF DESCRIPTION OF THE DRAWINGS

Aspects of the present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS

As mentioned above, various embodiments provide running containerized clusters (e.g., clusters) along with a radio access network ("RAN") or Open RAN ("O-RAN") to coordinate workloads in a cellular network, such as a 5G cellular network.

Broadly speaking, embodiments of the present invention provide methods, apparatuses and computer implemented systems for configuring a 5G cellular network using servers at cell sites, cellular towers and clusters that stretch from a public network to a private network.

Establishing a Cellular Network Using Containerized Clusters

First, the configuration using containerized application is discussed below. The containerized application can be any containerized application but is described herein as clusters for ease of illustration, but it should be understood that the present invention should not be limited to clusters and any containerized applications could instead be employed. In other words, the below description uses clusters and exemplary embodiments but the present invention should not be limited to clusters.

A cluster may be part of a set of nodes that run containerized applications. Containerizing applications is an operating system-level virtualization method used to deploy and run distributed applications without launching an entire virtual machine (VM) for each application.

A cluster configuration software is available at a cluster configuration server. This guides a user, such as system administrator, through a series of software modules for configuring hosts of a cluster by defining features and matching hosts with requirements of features so as to enable usage of the features in the cluster. The software automatically mines available hosts, matches host with features requirements, and selects the hosts based on host-feature compatibility. The selected hosts are configured with appropriate cluster settings defined in a configuration template to be part of the cluster. The resulting cluster configuration provides an optimal cluster of hosts that are all compatible with one another and allows usage of various features. Additional benefits can be realized based on the following detailed description.

The present application uses such containerized applications (e.g., clusters) to deploy a RAN so that the virtual distributed unit ("vDU") (also referred to herein as the "DU") of the RAN is located at one cluster and the virtual centralized unit ("vCU") (also referred to herein as the "CU") is located at a remote location from the vDU, according to some embodiments. This configuration allows for a more stable and flexible configuration for the RAN.

It should be understood that the present application is equally applicable to an O-RAN and thus, whenever the description herein refers to "RAN", it should also be understood that the description equally works with an O-RAN.

With the above overview in mind, the following description sets forth numerous exemplary details in order to provide an understanding of at least some embodiments of the present invention. It will be apparent, however, to one skilled in the art that the present invention may be practiced without some or all of these details described herein and thus, should not be limited. Operations may be done in different orders, and may or may not include some of the processes described herein. Several exemplary embodiments of the invention will now be described in detail with reference to the accompanying drawings.

Figure 1:
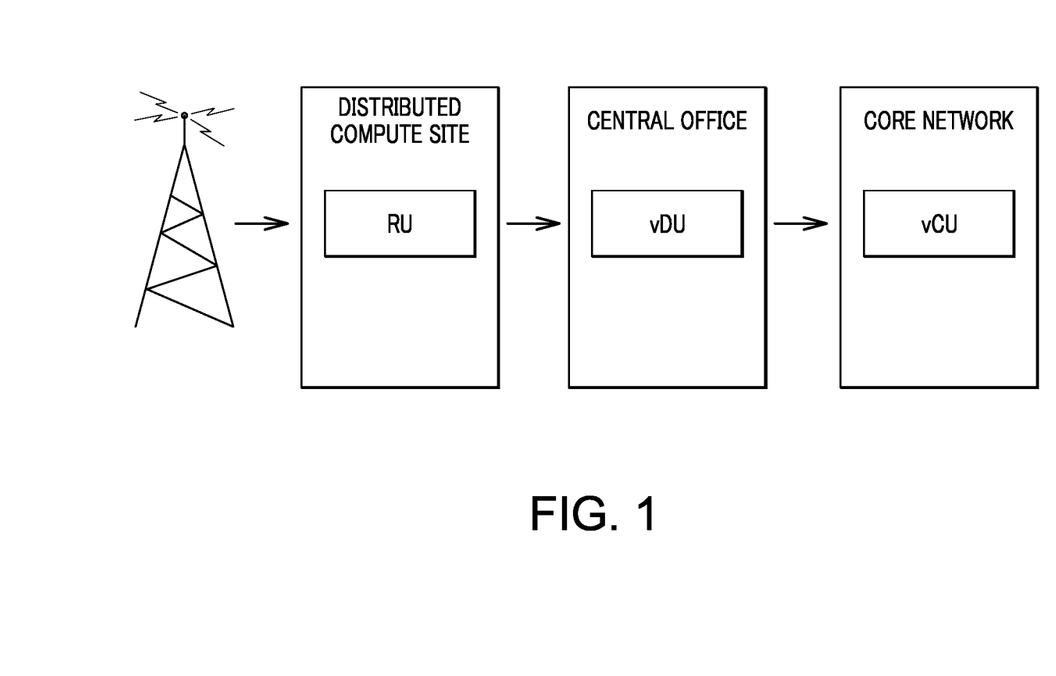
FIG. 1 illustrates a high level block diagram showing a 5G cellular network using vDUs and a vCU.

FIG. 1 illustrates a system that delivers full RAN functionality using network functions virtualization (NFV) infrastructure. In the embodiment shown in FIG. 1, the RAN includes a tower, radio unit (RU), a DU, a CU, and an element management system (EMS) (not shown). This approach decouples baseband functions from the underlying hardware and creates a software fabric. Within the solution architecture, virtualized baseband units (vBBU) process and dynamically allocate resources to remote RUs based on the current network needs. Baseband functions are split between CU, DUs and RUs that can be deployed in aggregation centers or in central offices (or data centers) using a distributed architecture, such as using clusters as discussed herein.

The virtualized CUs and DUs run as virtual network functions (VNFs) within the NFV infrastructure. The entire software stack that is needed is provided for NFV, including open source software. This software stack and distributed architecture increases interoperability, reliability, performance, manageability, and security across the NFV environment.

RAN standards may have deterministic, low-latency, and low-jitter signal processing, in some embodiments. These may be achieved using containerized applications (e.g., clusters) to control respective DUs, RUs and towers. Moreover, the RAN may support different network topologies, allowing the system to choose the location and connectivity of all network components. Thus, the system allowing various DUs on containerized applications (e.g., clusters) allows the network to pool resources across multiple cell sites, scale capacity based on conditions, and ease support and maintenance requirements.

Figure 2:
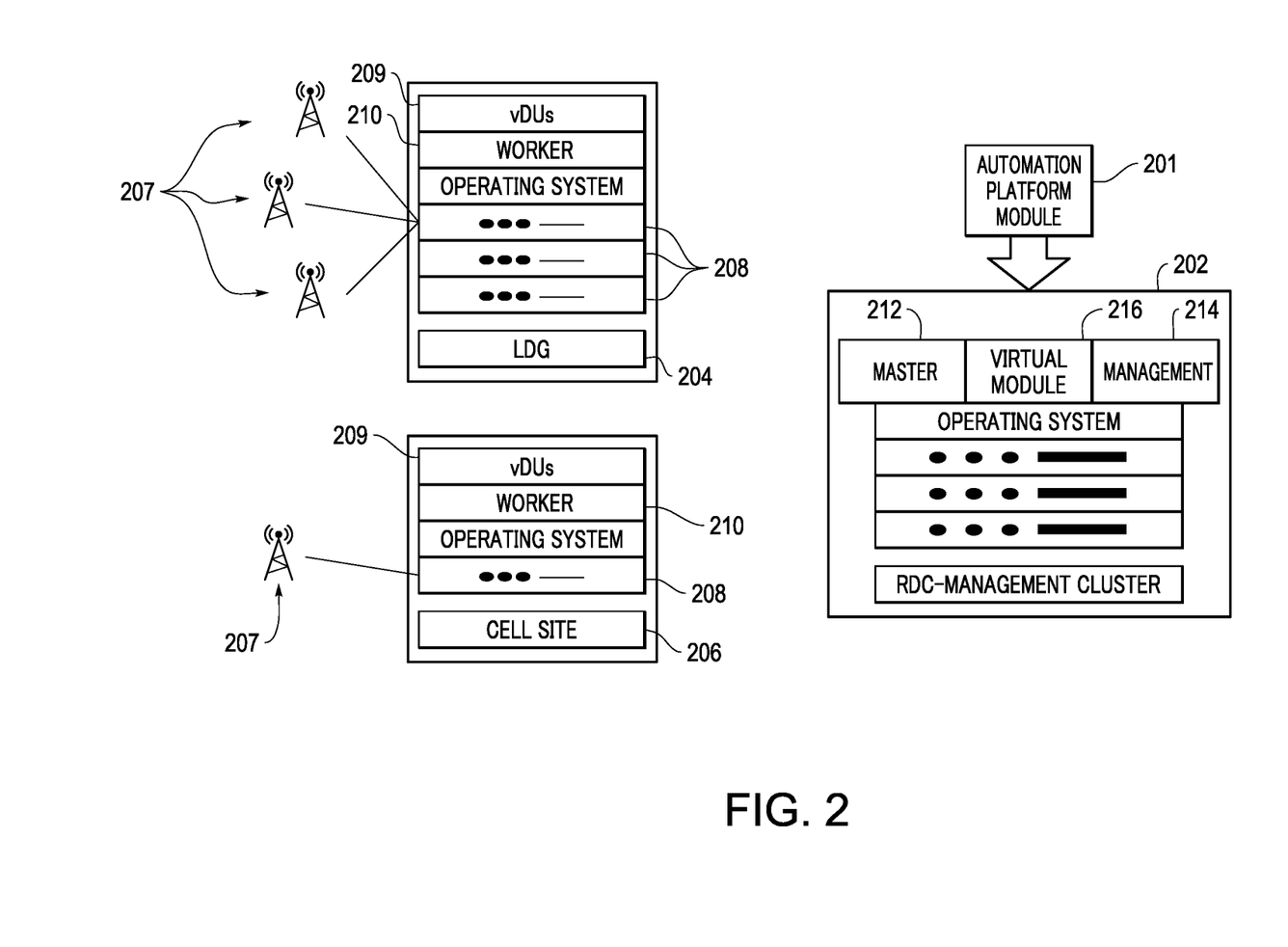
FIG. 2 illustrates a high level block diagram showing 5G cellular network with clusters.

FIG. 2 illustrates an exemplary system used in constructing clusters that allows a network to control cell sites, in one embodiment of the invention. The system includes a cluster configuration server that can be used by a cell site to provide various containers for processing of various functions. Each of the cell sites are accessed via at least one cellular tower (and RRU) by the client devices, which may be any computing device which has cellular capabilities, such as a mobile phone, computer or other computing device.

As shown, the system includes an automation platform (AP) module 201, a remote data center (RDC) 202, one or more local data centers (LDC), and one or more cell sites 206.

The cell sites 206 provide cellular service to the client devices through the use of a vDU 209, server 208, and a tower 207. The server 208 at a cell site 206 controls the vDU 209 located at the cell site 206, which in turn controls communications from the tower 207. Each DU 209 is software to control the communications with the towers 207, RUs, and CU so that communications from client devices (not shown) can communicate from one tower 207 through the clusters to another cellular tower 207. In other words, the voice and data from a cellular mobile client device connects to the towers 207 and then goes through the DU 209 to transmit such voice and data to another DU 209 to output such voice and data to another tower 207 using workers 210 networked via a core network/CU.

The server(s) 208 on each individual cell site 206 or LDC 204 may not have enough computing power to run a control plane that supports the functions in the mobile telecommunications system to establish and maintain the user plane. As such, the control plane may be run in a location that is remote from the cell cites 206, such as the RDC 202.

The RDC 202 is the management cluster which manages the LDC 204 and a plurality of cell sites 206. As mentioned above, the control plane may be deployed in the RDC 202. The control plane maintains the logic and workloads in the cell sites 206 from the RDC 202 while each of the containerized applications (e.g., containers) is deployed at the cell sites 206. The control plane also monitors the workloads that are running properly and efficiently in the cell sites 206 and fixes any workload failures. If the control plane determines that a workload fails at the cell site 206, for example, the control plane redeploys the workload on the cell site 206.

The RDC 202 may include a master 212 (e.g., master), a management module 214 and a virtual (or virtualization) module 216. The master module 212 monitors and controls the workers 210 (also referred to herein as workers) and the applications running thereon, such as the DUs 209. If a DU 209 fails, the master module 212 recognizes this, and will redeploy the DU 209 automatically. In this regard, the clusters system has intelligence to maintain the configuration, architecture and stability of the applications running. Accordingly, the clusters system may be considered to be "self-healing".

The management module 214 along with the Automation Platform 201 creates the clusters in the LDCs 204 and cell sites 206.

For each of the servers 209 in the LDC 204 and the cell sites 206, an operating system is loaded in order to run the workers 210. For example, such software could be ESKi and Photon OS. The DUs are also software, as mentioned above, that runs on the workers 210. In this regard, the software layers are the operating system, the workers 210, and then the DUs 209 as illustrated in FIG. 2.

The automation platform module 201 includes a GUI that allows a user to initiate clusters. The automation platform module 201 communicates with the management module 214 so that the management module 214 may create the clusters and a master module 212 for each cluster.

Prior to creating each of the clusters, the virtualization center 216 module creates a virtual machine (VM) so that the clusters can be created. VMs and containers are parts of the containerized applications (e.g., clusters) infrastructure of data centers and cell sites. VMs are emulations of particular computer systems that operate based on the functions and computer architecture of real or hypothetical computers. A VM is equipped with a full server hardware stack that has been virtualized. Thus, a VM includes virtualized network adapters, virtualized storage, a virtualized CPU, and a virtualized BIOS. Since VMs include a full hardware stack, each VM may include a complete operating system (OS) to function, and VM instantiation thus may need booting a full OS.

In addition to VMs, which provide abstraction at the physical hardware level (e.g., by virtualizing the entire server hardware stack), containers are created on top of the VMs. Containers provide abstraction at the OS level. In most container systems, the user space is also abstracted. Application presentation systems create a segmented user space for each instance of an application. Applications may be used, for example, to deploy an office suite to dozens or thousands of remote workers. In doing so, these applications create sandboxed user spaces on a server for each connected user. While each user shares the same operating system instance including kernel, network connection, and base file system, each instance of the office suite has a separate user space.

In any event, once the VMs and containers are created, the master modules 212 then create a DU 209 for each VM, as will be described later herein.

FIG. 2 also shows an LDC 204. In some embodiments, the LDC 204 is a data center that can support multiple servers and multiple towers for cellular communications. The LDC 204 is similar to the cell sites 206 except that each LDC 204 has multiple servers 208 corresponding to multiple towers 207 whereby each cell site 206 may only have a single server. Each server in the LDC 204 (as compared with the server in each cell site 206) may support multiple towers. The server 208 in the LDC 204 may be different from the server 208 in the cell site 206 because the servers 208 in the LDC 204 are larger in memory and processing power (number of cores, etc.) relative to the servers 208 in the individual cell sites 206. In this regard, each server 208 in the LDC 204 may run multiple DUs (e.g., 2 DUs), where each of these DUs independently operates a cell tower 207. Thus, multiple towers 207 can be operated through the LDCs 204 using multiple DUs using the clusters. The LDCs 204 may be placed in bigger metropolitan areas whereas individual cell sites 206 may be placed at smaller population areas.

Figure 3:
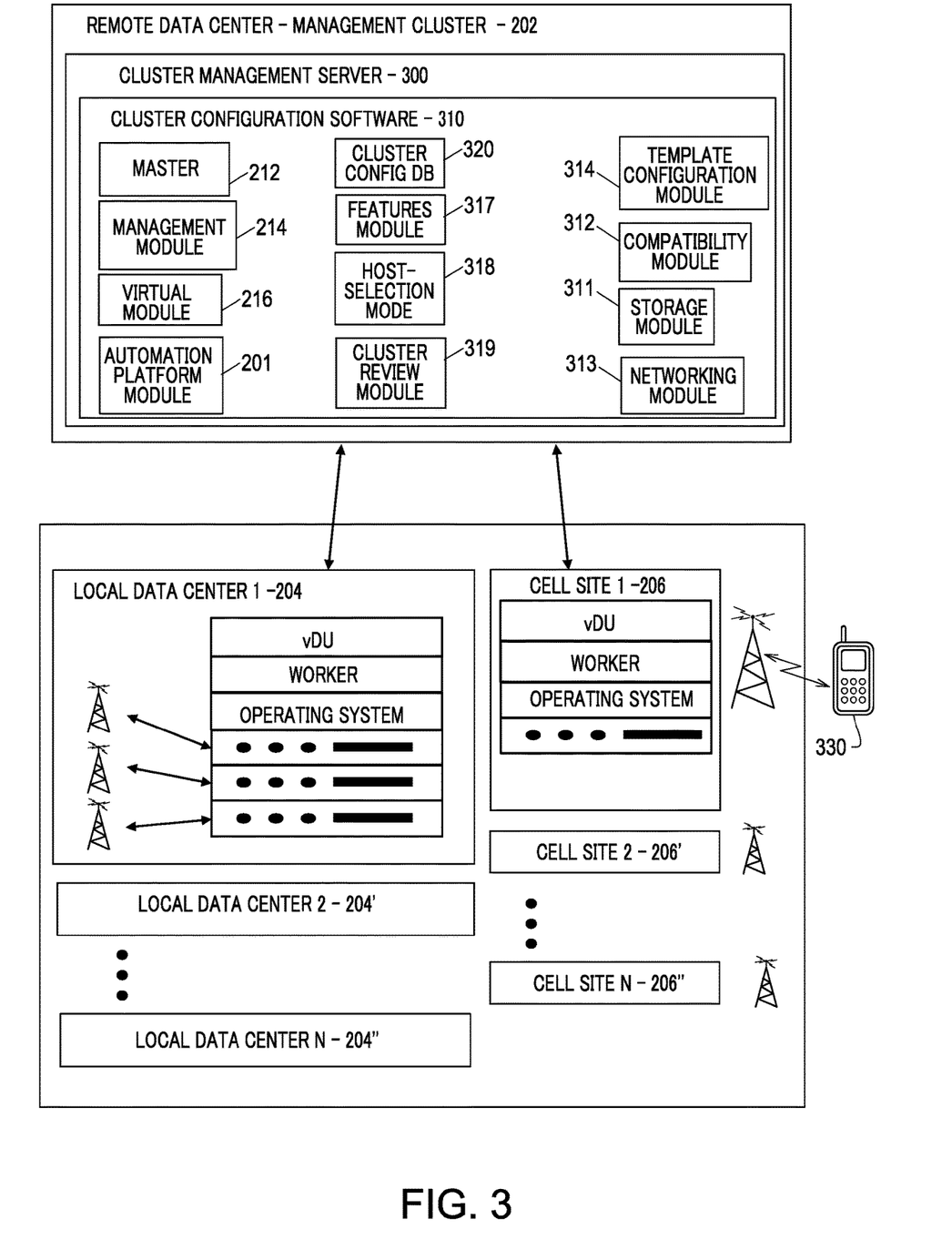
FIG. 3 illustrates a block diagram of the system of FIG. 2 but further illustrating details of cluster configuration software, according to various embodiments.

FIG. 3 illustrates a block diagram of the system of FIG. 2 but further illustrating details of cluster configuration software, according to various embodiments.

As illustrated, a cluster management server 300 is configured to run the cluster configuration software 310. The cluster configuration software 310 runs using computing resources of the cluster management server 300. The cluster management server 300 is configured to access a cluster configuration database 320. In one embodiment, the cluster configuration database 320 includes a host list with data related to a plurality of hosts 330 including information associated with hosts, such as host capabilities. For instance, the host data may include list of hosts 330 accessed and managed by the cluster management server 300, and for each host 330, a list of resources defining the respective host's capabilities. Alternately, the host data may include a list of every host in the entire virtual environment and the corresponding resources or may include only the hosts that are currently part of an existing cluster and the corresponding resources. In an alternate embodiment, the host list is maintained on a server that manages the entire virtual environment and is made available to the cluster management server 300.

In addition to the data related to hosts 330, the cluster configuration database 320 includes features list with data related to one or more features including a list of features and information associated with each of the features. The information related to the features include license information corresponding to each feature for which rights have been obtained for the hosts, and a list of requirements associated with each feature. The list of features may include, for example and without limitations, live migration, high availability, fault tolerance, distributed resource scheduling, etc. The list of requirements associated with each feature may include, for example, host name, networking and storage requirements. Information associated with features and hosts are obtained during installation procedure of respective components prior to receiving a request for forming a cluster.

Each host is associated with a local storage and is configured to support the corresponding containers running on the host. Thus, the host data may also include details of containers that are configured to be accessed and managed by each of the hosts 330. The cluster management server 300 is also configured to access one or more shared storage and one or more shared network.

The cluster configuration software 310 includes one or more modules to identify hosts and features and manage host-feature compatibility during cluster configuration. The configuration software 310 includes a compatibility module 312 that retrieves a host list and a features list from the configuration database 320 when a request for cluster construction is received from the client. The compatibility module 312 checks for host-feature compatibility by executing a compatibility analysis which matches the feature requirements in the features list with the hosts capabilities from the host list and determines if sufficient compatibility exists for the hosts in the host list with the advanced features in the features list to enable a cluster to be configured that can utilize the advanced features. Some of the compatibilities that may be matched include hardware, software and licenses.

It should be noted that the aforementioned list of compatibilities are exemplary and should not be construed to be limiting. For instance, for a particular advanced feature, such as fault tolerance, the compatibility module checks whether the hosts provide a compatible processor family, host operating system, hardware virtualization enabled in the BIOS, and so forth, and whether appropriate licenses have been obtained for operation of the same. Additionally, the compatibility module 312 checks to determine if networking and storage requirements for each host in the cluster configuration database 320 are compatible for the selected features or whether the networking and storage requirements may be configured to make them compatible for the selected features. In one embodiment, the compatibility module checks for basic network requirements. This might entail verifying each host's connection speed and the subnet to determine if each of the hosts has the desired speed connection and access to the right subnet to take advantage of the selected features. The networking and storage requirements are captured in the configuration database 320 during installation of networking and storage devices and are used for checking compatibility.

The compatibility module 312 identifies a set of hosts accessible to the management server 300 that either matches the requirements of the features or provides the best match and constructs a configuration template that defines the cluster configuration settings or profile that each host needs to conform in the configuration database 320. The configuration analysis provides a ranking for each of the identified hosts for the cluster. The analysis also presents a plurality of suggested adjustments to particular hosts so as to make the particular hosts more compatible with the requirements. The compatibility module 312 selects hosts that best match the features for the cluster. The cluster management server 300 uses the configuration settings in the configuration template to configure each of the hosts for the cluster. The configured cluster allows usage of the advanced features during operation and includes hosts that are most compatible with each other and with the selected advanced features.

In addition to the compatibility module 312, the configuration software 310 may include additional modules to aid in the management of the cluster including managing configuration settings within the configuration template, addition/deletion/customization of hosts and to fine-tune an already configured host so as to allow additional advanced features to be used in the cluster. Each of the modules is configured to interact with each other to exchange information during cluster construction. For instance, a template configuration module 314 may be used to construct a configuration template to which each host in a cluster may conform based on specific feature requirements for forming the cluster. The configuration template is forwarded to the compatibility module which uses the template during configuration of the hosts for the cluster. The host configuration template defines cluster settings and includes information related to network settings, storage settings and hardware configuration profile, such as processor type, number of network interface cards (NICs), etc. The cluster settings are determined by the feature requirements and are obtained from the Features list within the configuration database 320.

A configuration display module may be used to return information associated with the cluster configuration to the client for rendering and to provide options for a user to confirm, change or customize any of the presented cluster configuration information. In one embodiment, the cluster configuration information within the configuration template may be grouped in sections. Each section can be accessed to obtain further information regarding cluster configuration contained therein.

A features module 317 may be used for mining features for cluster construction. The features module 317 is configured to provide an interface to enable addition, deletion, and/or customization of one or more features for the cluster. The changes to the features are updated to the features list in the configuration database 320. A host-selection module 318 may be used for mining hosts for cluster configuration. The host-selection module 318 is configured to provide an interface to enable addition, deletion, and/or customization of one or more hosts. The host-selection module 318 is further configured to compare all the available hosts against the feature requirements, rank the hosts based on the level of matching and return the ranked list along with suggested adjustments to a cluster review module 319 for onward transmission to the client for rendering.

The cluster review module 319 may be used to present the user with a proposed configuration returned by the host-selection module 318 for approval or modification. The configuration can be fine-tuned through modifications in appropriate modules during guided configuration set-up which are captured and updated to the host list in either the configuration database 320 or the server. The suggested adjustments may include guided tutorial for particular hosts or particular features. In one embodiment, the ranked list is used in the selection of the most suitable hosts for cluster configuration. For instance, highly ranked hosts or hosts with specific features or hosts that can support specific applications may be selected for cluster configuration. In other embodiments, the hosts are chosen without any consideration for their respective ranks. Hosts can be added or deleted from the current cluster. In one embodiment, after addition or deletion, the hosts are dynamically re-ranked to obtain a new ranked list. The cluster review module 312 provides a tool to analyze various combinations of hosts before selecting the best hosts for the cluster.

A storage module 311 enables selection of storage requirements for the cluster based on the host connectivity and provides an interface for setting up the storage requirements. Shared storage may be needed in order to take advantage of the advanced features. As a result, one should determine what storage is shared by all hosts in the cluster and use only those storages in the cluster in order to take advantage of the advanced features. The selection options for storage include all the shared storage available to every host in the cluster. The storage interface provides default storage settings based on the host configuration template stored in the configuration database 320 which is, in turn, based on compatibility with prior settings of hosts, networks and advanced features and enables editing of a portion of the default storage settings to take advantage of the advanced features. In one embodiment, if a certain storage is available to only a selected number of hosts in the cluster, the storage module 311 will provide necessary user alerts in a user interface with tutorials on how to go about fixing the storage requirement for the configuration in order to take advantage of the advanced features. The storage module performs edits to the default storage settings based on suggested adjustments. Any updates to the storage settings including a list of selected storage devices available to all hosts of the cluster are stored in the configuration database 320 as primary storage for the cluster during cluster configuration.

A networking module 313 enables selection of network settings that is best suited for the features and provides an interface for setting up the network settings for the cluster. The networking module provides default network settings, including preconfigured virtual switches encompassing several networks, based on the host configuration template stored in the cluster configuration database, enables selecting/editing the default network settings to enter specific network settings that can be applied/transmitted to all hosts, and provides suggested adjustments with guided tutorials for each network options so a user can make informed decisions on the optimal network settings for the cluster to enable usage of the advanced features. The various features and options matching the cluster configuration requirements or selected during network setting configuration are stored in the configuration database and applied to the hosts so that the respective advanced features can be used in the cluster.

Location Determination

FIG. 3 also illustrates a mobile phone 330, which is configured to send cellular signals to towers of a cell site 206 when the mobile phone 330 performs a call, sends any type of data, or for any data transmissions or receptions (voice, data, SMS, MMS, etc.). The cell site 206 that the mobile phone 330 connects to is the one that is associated with the cell that the mobile phone 330 is associated with.

It should be noted that a mobile phone 330 is used and described herein as the device with which is being located but it should be understood that the present invention should not be limited to a mobile phone and instead can be any mobile cellular wireless communication device, such as a cellular wireless tablet, cellular wireless watch, or any other mobile wireless device which is configured to send and/or receive cellular signals to/from the cellular network made of clusters, as discussed in FIGS. 1-3.

Figure 4:
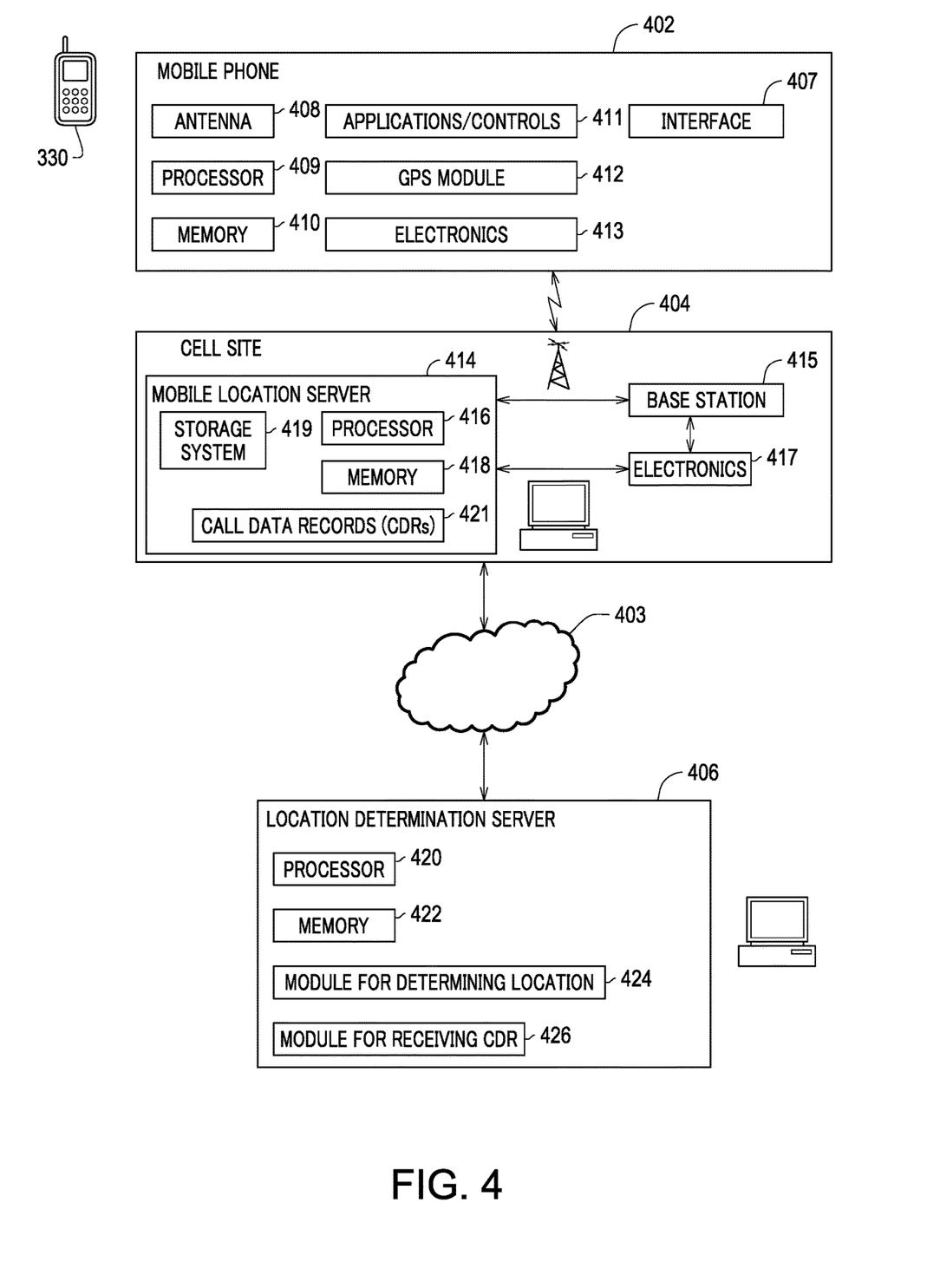
FIG. 4 illustrates a system of a determining a location of a mobile phone, according to various embodiments.

FIG. 4 illustrates an embodiment of a mobile phone 330 (which should not be limited to a phone as explained above), a cell site 404, and a location determination server 406. The mobile phone 330 includes an interface 407, an antenna 408, a processor 409, memory 410, applications/controls 411, a GPS module 412, and electronics 413. Each of these components is discussed in greater detail below. The antenna 408 is configured to transmit and receive voice/data signals from a wireless connection on the network via at least one cell site 404. These signals are then processed by the processor 206 and software in the mobile phone 330.

The processor 409 may be a hardware processor (e.g., CPU) that is configured to execute instructions stored in memory 410. The processor 409 is configured to interact with each of the applications/modules 411, 412, 413, 414 and stored data and other software and/or data stored in the memory 410.

Any of the applications/modules 411, 412, 413, 414 and other software modules or data may be stored in the memory 410. The memory 410 may be any type of temporary or persistent storage device capable of storing instructions and data. The memory 410 may be internal and/or external to the mobile phone 330 and may include one or more storage devices. In one embodiment, the memory 410 is a non-transitory computer readable storage medium having a physical presence configured for long term and/or short term storage of data. For example, the memory 410 may be an internal hard drive, chip, or flash memory.

The applications/controls 411 is software with instructions that are executed by the processor to perform functions of the mobile phone 330. Examples of the applications/controls 411 may be to control the antenna of the phone to turn the antenna into active mode, inactive mode, or airplane mode. The applications/controls 411 is configured to control one or more components of the mobile phone 330 as desired by the user using the interface 407 (via a graphical user interface on the screen) of the mobile device 330.

The electronics 413 of the mobile phone 330 are configured to work with the processor 409, memory 410 and antenna to send/receive signals to/from the network via the cell site 404 or to prevent such communications. The electronics 413 may include a screen, logic to interconnect the hardware, and logic to process the signals to be sent and signals received.

The interface 407 includes not only GUIs for the user but a communications interface that works with the antenna 408 to communicate with the cell site 404, which includes a mobile location server 414, base station 415, and electronics 417.

As mentioned above, the location of the mobile phone 330 (or any other cellular wireless device) may be determined (using the GPS module 412 as a non-limiting example) and there are various methods and advantages to this. Indeed, the ability to routinely, reliably, and rapidly locate cellular wireless mobile phones has the potential to provide significant public benefit in public safety and convenience and in commercial and regulatory applications. A number of infrastructure-based, handset-based and network-based wireless location systems can be employed to locate the mobile phone while the mobile phone is active and transmitting/receiving signals.

Infrastructure-based location techniques for locating mobile phones 330 use information in use within the network (such as cell site 404) to generate an approximate geographic location. Infrastructure-based location techniques include CID (serving Cell-ID), CID-RTF (serving cell-ID plus radio time-of-flight time-based ranging), CIDTA (serving cell-ID plus time-based ranging), and Enhanced Cell-ID (ECID, a serving cell, time-based ranging and power difference of arrival hybrid). Signals that generate the network information that is the precursor to infrastructure-based location may be collected at the mobile phone 330 or at the base station 415 of a cell site 404 and delivered to a mobile location server 414 which has databased knowledge of both the network topology and geographic topology of the clustered network described in FIGS. 1-3. This is completed for each cell site 404 of a plurality of cells sites within the clustered network.

Network-based location solutions use the specialized electronics 417, such as specialized receivers and/or passive monitors within, or overlaid on, the network to collect uplink (mobile phone-to-base station) signals, which are used to determine location and velocity of the mobile phone 330. Overlay Network-based techniques include uplink Time-Difference-of-Arrival (TDOA), Angle-Of-Arrival (AOA), Multipath Analysis (RF fingerprinting), and signal strength measurement (SSM).

Mobile-device based location solutions use specialized electronics and/or software within the mobile phone 330 to collect signaling. Location determination can take place in the device or information can be transmitted to a landside server which determines the location. Device-based location techniques include CID (serving Cell-ID), CID-RTF (serving cell-ID plus radio time-of-flight time-based ranging), CIDTA (serving cell-ID plus time-based ranging), Enhanced Cell-ID (ECID, a serving cell, time-based ranging and power difference of arrival hybrid), Advanced-Forward-Link-Trilateration (AFLT), Enhanced Observed Time Difference (E-OTD), Observed-Time-Difference-of-Arrival (OTDOA) and Global Navigation Satellite System (GNSS) positioning. An example of a GNSS system is the United States NavStar Global Positioning System (GPS).

Hybrids of the network-based and mobile device-based techniques can be used to generate improved quality of services including improved speed, accuracy, yield, and uniformity of location. A wireless location system determines geographic position and, in some cases, the speed and direction of travel of wireless devices. Wireless location systems use uplink (device-to-network) signals, downlink (network-to-device) signals, or non-communications network signals (fixed beacons, terrestrial broadcasts, and/or satellite broadcasts). Network-based location solutions use specialized receivers and/or passive monitors within, or overlaid on, the wireless communications network to collect signaling used to determine location. Network-based techniques include uplink Time-Difference-of-Arrival (TDOA), Angle-Of-Arrival (AOA), Multipath Analysis (RF fingerprinting), and signal strength measurement (SSM). Hybrids of the network-based techniques can be used to generate improved quality of services including speed, accuracy, yield, and uniformity of location.

These descriptions for infrastructure-based location determination systems enable robust and effective location-determination performance when adequate measurement data can be derived or are otherwise available.

Moreover, a Call Data Record ("CDR", also known as Call Detail Record) is a data record which is generated at a telecommunication provider and is related to setup and termination of a call performed by a user through a mobile device and/or any form of data update performed by the mobile device. The CDR can adopt different formats depending on different telecom providers, and can include the location information of the mobile device Cell-ID (and of the user who holds the mobile device) and time information of the call. For example, the CDR can include information indicating an initiator of the call (e.g., an ID of the mobile device), information indicating a cell where the initiator initiates the call (e.g., an ID of the cell), information indicating a time at which the initiator initiates the call, information indicating a receiver of the call (e.g., an ID of a mobile device), information indicating the cell where the receiver is located (e.g., an ID of the cell), and a duration of the call. In many applications, the CDR is a data source to determine the location of criminals or suspects in efforts to determine evidence in the prosecution of crimes.

Additionally, the location information in the CDRs can be used for regulatory and commercial purposes. For regulatory use cases, after an incident in a geographical area, low enforcement agencies (LEAs) may ask the network operators the identity of all the subscribers in that area to determine suspects for a crime. For commercial use cases, the operator can use analytics for different purposes, i.e., location-based commercials, service optimization, etc.

Regardless of the application, these are all dependent on the mobile phone having the antenna of the mobile phone 330 active because the CDRs are created only during the device being in active mode (e.g., mode where the antenna is activity configured to send/receive).

In this regard, if the mobile device 330 is in airplane mode or the antenna is powered off, in airplane mode, or idle mode (i.e., inactive mode or no transmissions/receptions for a period of time) or deactivated (so that data/voice transmissions/receptions are not possible), the CDR will not record where the mobile device is located during those times and thus, determining the location of the user at all times is a challenge. For instance, some people involved in an incident or crime may either turn off their devices, or put their devices on airplane mode and thus, do not use the network during the incident, which thus will not create CDRs and thus the location of the mobile phones 330 during this time period will not be recorded in the CDR.

Thus, according to the present application, a location determination server 406 (or other system) may determine the location of the mobile phone 330 even when the mobile phone is powered off, in inactive mode, or in airplane mode. The location determination server 406 includes at least a processor 420, memory 422, a module for determining location 424, and a module for receiving CDRs 426. Each of these components is discussed in greater detail below.

The processor 420 may be a hardware processor (e.g., CPU) that is configured to execute instructions stored in memory 422. The processor 420 is configured to interact with each of the modules 424, 426 and stored data and other software and/or data stored in the memory 422. For example, the processor 420 is configured to perform at least one or more or all of the steps presented herein, including those shown in FIGS. 5 and 6.

Any of the applications/modules 424, 426 and other software modules or data may be stored in the memory 422. The memory 422 may be any type of temporary or persistent storage device capable of storing instructions and data. The memory 422 may be internal and/or external to the server 406 and may include one or more storage devices. In one embodiment, the memory 422 is a non-transitory computer readable storage medium having a physical presence configured for long term and/or short term storage of data. For example, the memory 410 may be an internal hard drive or flash memory.

The module for receiving CDRs 426 is configured for requesting and receiving, in response to the request, CDRs associated with a particular mobile phone or a series of mobile phones or all the mobile phones in a specific geographical area of interest. The module for receiving CDRs 426 will send a request to receive such CDRs and such request may include: identification of the mobile phone(s) 330, identification of the user of the mobile phone 330, identification of a time period of interest being from a first time to a second time, etc. The module for receiving CDRs 426 is configured to send the request to the cell site 404 and/or the core network.

Figure 5:
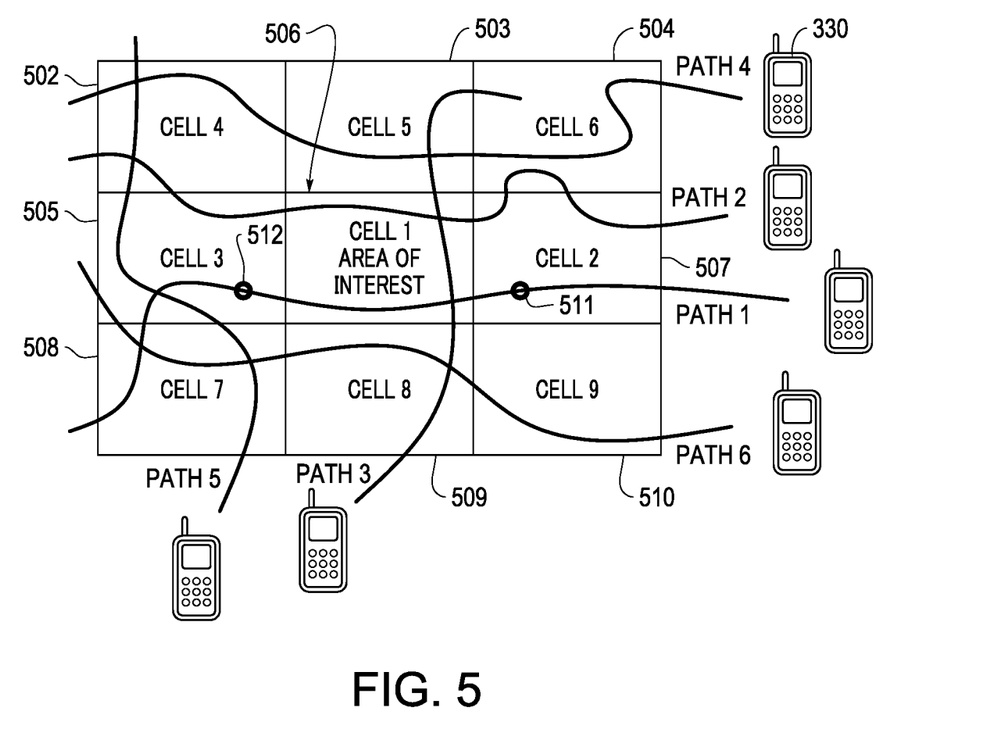
FIG. 5 illustrates various paths of a mobile phone with regard to different cells, in according with some embodiments.
Figure 6:
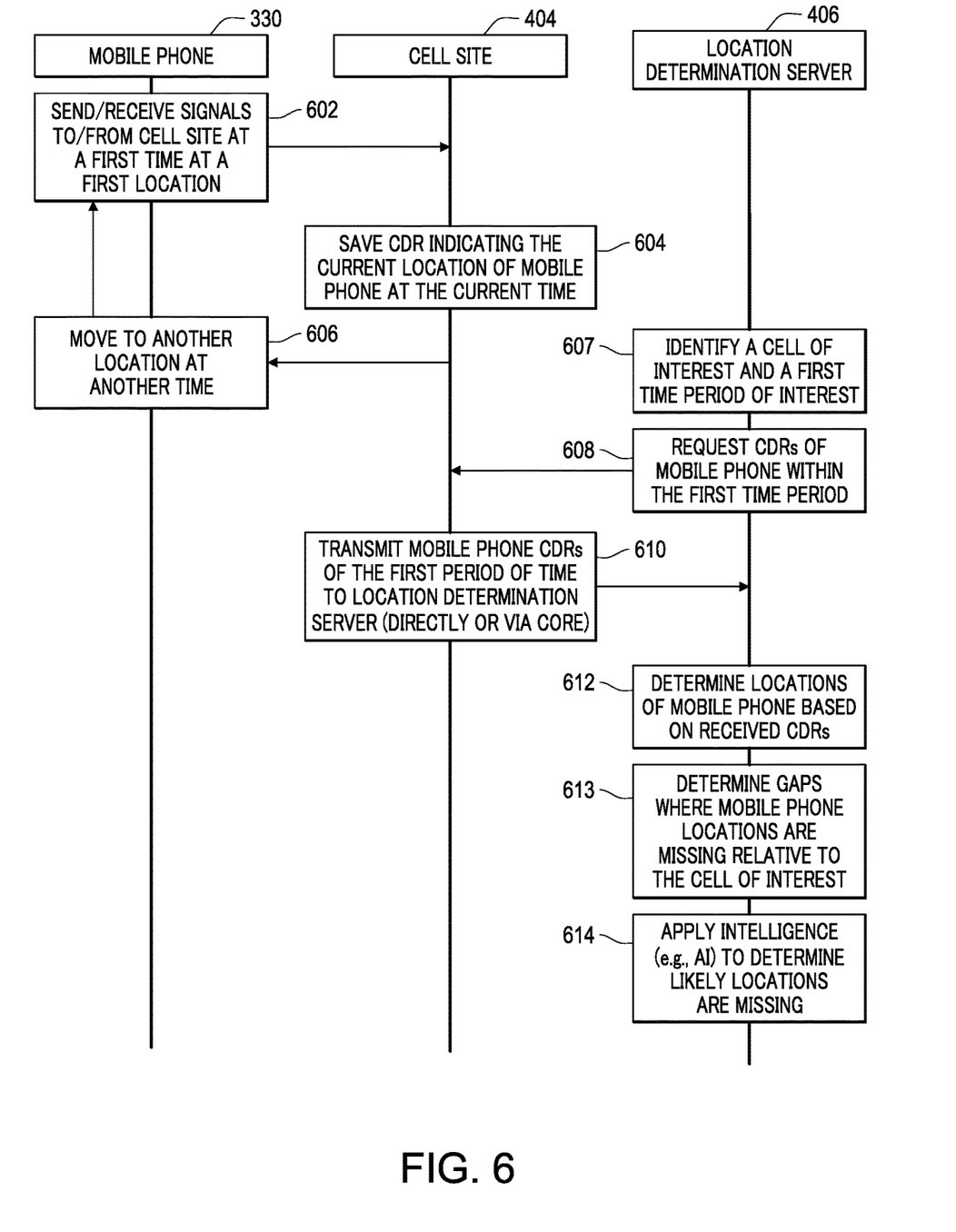
FIG. 6 illustrates a method of determining a location of a mobile phone, in according with some embodiments.

The module for determining location 424 may be software with instructions that are executed by the processor 420 to perform functions of the FIG. 6. Examples of the module for determining location 424 may be to: (1) determine the known locations of the mobile phone 330 using CDRs, (2) determine the cells that the known locations were within, (3) identify a cell of interest and a time period of interest, (4) determine possible paths of the mobile phone during the time period of interest relative to the cell of interest, and (5) use intelligence to determine the likely locations of the mobile phone 330 when the antenna of the mobile phone 330 was inactive. These functions are discussed more depth with regard to FIGS. 5 and 6.

As discussed above, the cell site 404 includes a server (such as mobile location server 414), a base station 415 and electronics 417. The base station 415 includes a tower to directly transmit/receive signals to/from the mobile phone 330 and converts these signals into a format usable by the server 414. The processor 416 may be a hardware processor (e.g., CPU) that is configured to execute instructions stored in memory 418 and/or storage system 419. The processor 416 is configured to store data (e.g., CDRs 421) stored in the memory 418 and execute software instructions. For example, the processor 206 is configured to perform at least one or more or all of the steps presented herein, including those shown in FIG. 6.

The memory 418 may be any type of temporary or persistent storage device capable of storing instructions and data. The memory 418 may be internal and/or external to the cell site 404 and may include one or more storage devices. In one embodiment, the memory 418 is a non-transitory computer readable storage medium having a physical presence configured for long term and/or short term storage of data. For example, the memory 418 may be an internal hard drive or flash memory.

The cell site 404 is configured to communicate with the location determination server 406 over a network 403, such as the Internet, a local area network (LAN), or a wide area network (WAN).

FIG. 5 illustrates a diagram showing various paths a mobile phone may take in a given area, according to one embodiment. As shown, there are multiple cells 502-510 and various possible paths (Path 1 to Path 6) that the mobile phone 330 can take based on different roads, paths, etc. A cell of interest is a geographic area of interest to an entity or person (e.g., law enforcement). For example, the cell of interest may be where an incident or crime occurred.

If a mobile phone 330 is active all of the time, the CDRs will indicate where the user was relative to the cell of interest. For example, if mobile phone 330 is on Path 2 and enters into Cell 2 507 and exits from Cell 4 502 and is active during, turned off, idle, or in airplane mode at point 511 through point 512, then it is not clear if the user was in the cell of interest, i.e., Cell 1 506

However, if the mobile phone 330 was inactive, turned off, idle, or in airplane mode for a period of time around a time of interest or in the cell of interest, then it is difficult to tell if the user was associated with the incident of interest.

For example, in FIG. 5, if mobile phone 330 is on Path 1 and enters into Cell 2 507 and exits from Cell 3 505 but is inactive, turned off, idle, or in airplane mode at point 511 through point 512, then it is not clear if the user was in the cell of interest, i.e., Cell 1 506.

However, intelligence can assist in determining likely paths that the mobile phone took. The artificial intelligence and machine learning (AI/ML) engines looks at a larger geographical area and a longer period of time and uses: (1) the known locations and timestamps of the devices in the larger geographical area; (2) the routes (paths) between the known locations of the devices based on the map (e.g., Google Map), the traffic of the routes and timestamps; and (3) the history of the subscribers' locations. The AI is configured to provide the probability of presence of the IDLE-mode/AIRPLANE-mode/OFF etc. in each geographical area including the geographical area that incident happened. This list can help the users (e.g., LEAs) to have the list of people who were present in the area of interest and the list of people who were likely present in that area.

Referring back to FIG. 5, let us assume that Cell 1 502 is the area of interest during 2:00 pm-4:00 pm, and CDRs provide the devices transmitting or receiving in Cell 1 during this period of time (active devices). The larger area (Cell 1 through Cell 9) is checked between 1:00 pm-5:00 pm all the devices are listed that were in IDLE/AIRPLANE/OFF during 2:00-4:00 pm in the greater area and longer time period (1:00-5:00 pm). Then the devices that were active and NOT in Cell 1 during 2:00-4:00 pm are removed. The AI/ML engine provides the list of devices that were IDLE/AIRPLANE/OFF and had a chance to be present in Cell 1 during 2:00-4:00 pm. Then, the known locations/timestamps of the IDLE/AIRPLANE/OFF devices are checked, and the existing roads/routes between the known locations are checked; the traffic, timestamps, etc as well as the history of the device are checked, and a probability that devices were in Cell 1 during 2:00-4:00 pm are assigned.

FIG. 6 illustrates a method for location determination of a mobile phone even though the mobile phone has gone inactive, powered off, etc., according to some embodiments. As shown at block 602, the mobile phone 330 communicates with the cell site via a base station at a first time at a first location. While the mobile phone 330 is performing such communications, CDRs are being created and each CDR includes a timestamp, where the mobile phone 330 is located at each respective at the timestamp, the data sent or number called, the cell being used at the timestamp, identification of the mobile phone 330 communicating with the cell site, and the like.

The cell site 404 then saves each CDR in memory at the cell site 404, as block 604. In other embodiments the CDRs are stored on the core network in a public cloud where the core network resides. Since the core network is implemented in the cloud, the saving of the CDRs also occurs in the cloud as well.

At block 606, the mobile phone 330 then moves to another location, such as within the same cell or in another cell. Then a new CDR may be created (or the current CDR may be updated to reflect this movement). The new or updated CDR will include the timestamp and Cell-ID of the mobile phone 330 when the timestamp was taken. The CDRs are created in real time with timestamps and the location of the mobile phone 330 at the timestamps and then the CDRs are then stored for future use.

At block 607, the location determination server 406 identifies a cell of interest (e.g., cell 1 from FIG. 5). This cell of interest may be transmitted or inputted by a third party (e.g., law enforcement) based on the geographical area identified by such third party as a location of interest. Additionally, the third party may also enter a period of time of interest if there is a time period that the third party would like to focus on.

At block 608, the location determination server 406 then will send a request to the cell site or core cellular network for the CDRs stored in memory. The request, as mentioned above, such request includes the first time period of interest and the cell of interest. Optionally, the cells proximate to the cell of interest may also be included in the request so that CDRs for the mobile phone in the proximate cells are included in the request.

In block 610, the cell site 404 (or other system such as the core, a database in the public cloud associated with the core network, or a database in a private database associated with the clusters) then will then be retrieve the CDRs associated with the mobile phone 330 or all the mobile phones in the cell of interest as well as the cells proximate to the cell of interest during the first time of interest as requested. Such CDRs will then be transmitted to the location determination server 406 directly or via the core network.

At block 612, the location determination server 406 receives the CDRs and then determines the locations of the mobile phone based on these CDRs. For example, if the time period of interest is Jun. 16, 2023 from 2-4 pm, the location determination server 406 will determine the locations of the mobile phone 330 in the cell of interest and/or in the cells proximate to the cell of interest.

At block 613, the location determination server 406 then determines the gaps in the locations and times where the location of the mobile phone 330 is not know because the mobile phone 330 was in airplane mode, idle mode, inactive mode or powered off. This may be done based on seeing a clear pattern of where the mobile phone 330 was headed (or stopped) and then the next location received is at least a predefined distance from the last known location.

Based on such gaps, the system will then apply intelligence (e.g., artificial intelligence) to determine the likely and possible locations of the mobile phone 330 where the locations are missing (gaps).

Some probabilistic machine learning algorithms can be used for classification of subs who might have visited the area of interest during the period of time of interest by the law enforcement agencies: (1) LCM algorithm (Latent class model) for probabilistic classification can be used to check with what probability a member belongs to specific class (e.g., in the class of visitor of the area of interest); and (2) Bayesian classifiers can be used for filtration (e.g., spam filtration), classifying analysis (same as LCM), etc. Some other methods are: Logistic Regression, Hidden Markov model, Neural Networks, etc.

It some embodiments, the intelligence can determine if a user is traveling on a road or path where the last location was and if the next known location is down the path after a certain distance, the model can determine that it is likely that the mobile phone was on the road or path while off, airplane mode, idle or inactive.

In this regard, the intelligence can use various factors in determining whether a user using a mobile phone traveling a certain path or was in the cell of interest, including historical locations or paths the user has taken, whether the likely path was on a road or path, determining points between the last known location and the next location received after a period of time after the last known location, directional data of the mobile phone, moving speeds, etc.

Once the intelligence determines the likely area the mobile phone 330 was in during the period of time the mobile phone 330 was idle, powered off, airplane mode, or inactive, the information is then transmitted to a third party (or computer) which will then process the data for a desired result.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a radio access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A cellular network system comprising:
   a plurality of clusters that are each configured to operate respective cell sites, wherein each cell site comprises:
      at least one tower configured to send and receive cellular communications to and from a cellular mobile phone; and
      a mobile location server that stores call data records (CDRs) for a cellular mobile phone and transmits the CDRs to a location determination server;
   a core network connected with the plurality of clusters over a wide area network via a master module,
   wherein the location determination server is configured for:
      receiving a first cell of interest and times of interest;
      receiving the CDRs associated with the first cell of interest and the times of interest; and
      determining possible locations of the cellular mobile phone at the times of interest when the mobile phone antenna is powered off, airplane mode, idle or inactive using the received CDRs.

2. The system of claim 1, wherein the CDRs associated with the mobile device include:
   a first CDR generated based on the mobile device being determined to be located in a second cell proximate to the first cell; and
   a second CDR generated based on the mobile device being determined to be located in a third cell proximate to the first cell.

3. The system of claim 2, wherein the possible locations include the first cell based on intelligence generated using the first CDR and the second CDR.

4. The system of claim 3, wherein the intelligence determines the possible locations of the cellular mobile phone based on locations and times of use of the mobile phone determined from the CDRs associated with the mobile phone and additional data including at least one of: historical movement patterns of the mobile phone, movement prediction based on locations determined from the CDRs, and movement speed and direction of the mobile phone.

5. The system of claim 1, wherein the location determination server is configured for:
  determining known locations of the mobile phone based on the received CDRs, and
  determining times, during the times of interest, where locations of the mobile phone are unknown.

6. The system of claim 1, wherein the location determination server is further configured to request the CDRs.

7. The system of claim 6, wherein the request includes: an identification of the mobile phone, an identification of one or more cells proximate to the first cell and the times of interest.

8. A system for cellular communications to determine possible locations of a mobile phone who has been in airplane mode, idle mode, inactive mode or powered off, the system communicating with a cellular network comprising a plurality of cell sites, wherein each cell site comprises: at least one tower configured to send and receive cellular communications to and from the mobile phone, and a mobile location server that stores call data records (CDRs) for the mobile phone; and a core network connected with the plurality of cell sites, the core network being deployed remote from each of the cell sites, wherein the system comprises
  a location determination server configured for:
    receiving a first cell of interest and times of interest;
    receiving the CDRs associated with the first cell of interest and the times of interest; and
    determining possible locations of the mobile phone at the times of interest when the mobile phone antenna is powered off, airplane mode, idle or inactive using the received CDRs.

9. The system of claim 8, wherein the CDRs associated with the mobile device include:
  a first CDR generated based on the mobile device being determined to be located in a second cell proximate to the first cell; and
  a second CDR generated based on the mobile device being determined to be located in a third cell proximate to the first cell.

10. The system of claim 9, wherein the possible locations include the first cell based on intelligence generated using the first CDR and the second CDR.

11. The system of claim 10, wherein the intelligence determines the possible locations of the cellular mobile phone based on the locations and times determined from the CDRs of the mobile phone and additional data including at least one of: historical movement patterns of the mobile phone, movement prediction based on locations determined from the CDRs, and movement speed and direction of the mobile phone.

12. The system of claim 8, wherein the location determination server is configured for:
  determining known locations of the mobile phone based on the received CDRs, and
  determining times, during the times of interest, where locations of the mobile phone are unknown.

13. The system of claim 8, wherein the location determination server is further configured to request the CDRs.

14. The system of claim 13, wherein the request includes: an identification of the mobile phone, an identification of one or more cells proximate to the first cell and the times of interest.

15. A method for determining a location of a mobile phone in a cellular network including when the mobile phone has been turned off, placed in airplane mode, inactive mode or in idle mode, the method comprising:
  receiving a first cell of interest and times of interest;
  requesting, by a location determination server in communication with the cellular network, call data records (CDRs) associated with the first cell of interest and the times of interest;
  receiving, by the location determination server, the requested CDRs associated with the first cell of interest and the times of interest; and
  determining possible locations of the mobile phone at the times of interest when the mobile phone antenna is powered off, airplane mode, idle or inactive using the received CDRs.

16. The method of claim 15, wherein the CDRs associated with the mobile device include:
  a first CDR generated based on the mobile device being determined to be located in a second cell proximate to the first cell; and
  a second CDR generated based on the mobile device being determined to be located in a third cell proximate to the first cell.

17. The method of claim 16, wherein the possible locations include the first cell based on intelligence generated using the first CDR and the second CDR.

18. The method of claim 17, wherein the intelligence determines the possible locations of the cellular mobile phone based on the locations and times determined from the CDRs of the mobile phone and additional data including at least one of: historical movement patterns of the mobile phone, movement prediction based on locations determined from the CDRs, and movement speed and direction of the mobile phone.

19. The method of claim 15, wherein the location determination server is configured for:
  determining known locations of the mobile phone based on the received CDRs, and
  determining times, during the times of interest, where locations of the mobile phone are unknown.

20. The method of claim 15, wherein the request includes: an identification of the mobile phone, an identification of one or more cells proximate to the first cell and the times of interest.

* * * * *